April 14, 1970   A. A. BALLMAN ET AL   3,506,929

LiTaO₃ ELECTRO-OPTIC MODULATOR

Filed Feb. 13, 1967

INVENTORS
A. A. BALLMAN
R. T. DENTON
P. V. LENZO
E. G. SPENCER

BY George S. Indig
ATTORNEY

United States Patent Office 3,506,929
Patented Apr. 14, 1970

3,506,929
LiTaO₃ ELECTRO-OPTIC MODULATOR
Albert A. Ballman, Woodbridge, Richard T. Denton, South Plainfield, Pascal V. Lenzo, Warren Township, Somerset County, and Edward G. Spencer, Berkeley Heights, N.J., assignors to Bell Telephone Laboratories, Incorporated, Murray Hill and Berkeley Heights, N.J., a corporation of New York
Filed Feb. 13, 1967, Ser. No. 615,811
Int. Cl. G02f *1/16*
U.S. Cl. 332—7.51
12 Claims

ABSTRACT OF THE DISCLOSURE

Single domain lithium tantalate evidences a substantial transverse electro-optic effect. Intensity, frequency, and phase modulators, either continuous or pulse, utilizing the tantalate may be operated over a bandwidth including the visible spectrum and the near infrared at modulation frequencies in the microwave range at low voltage and power.

BACKGROUND OF THE INVENTION

Field of the invention

The invention is concerned with the modulation of electromagnetic wave energy at frequencies including that of the visible spectrum. The ultimate objective is the use of such wave energy in communications systems, and to this end it is generally coherent. Laser sources operate over the visible spectrum and into the infrared, and for this reason it is such frequencies which are primarily of concern. Modulators of the type with which this invention is concerned operate on the electro-optic principle. They depend for their operation upon a material within which a transmission property for transmitted wave energy is altered by impression of an electric field. Such modulators may be continuous or pulse and may result in a variation in intensity, frequency, or phase.

Description of the prior art

Many materials have in the past been proposed for use in electro-optic modulators. Probably the best known of these is KDP (potassium dihydrogen phosphate). Due largely to its ready availability in suitable crystal size and perfection, most of the modulators described in the literature during the few years following announcement of the laser depended on this material. See, for example 5 Applied Optics 1612 (1966).

More recent developments include the quadratic materials exemplified by KTN (a solid solution of potassium tantalate and potassium niobeate) which, unlike KDP and other linear materials, shows an increasing electro-optic effect for each additional increment of applied biasing voltage. See 37 Journal of Applied Physics 388 (1966). For some time it appeared that the desideratum of reasonable modulation with applied fields sufficiently small to permit use of transistor circuitry would for the first time be permitted by use of biased quadratic materials. While such modulators have indeed been built and operated successfully, difficulties encountered in large-scale growth of such materials have thus far precluded commercial acceptance. Considerable attention continues to be directed to this class of materials, and should the practical difficulties be overcome, it is quite likely that representative compositions will one day find extensive use.

More recent work is directed to the other modulation effects such as in junction devices, or by use of magneto-optic interactions, or by use of linear electro-optic materials, this class again being represented by KDP.

Most electro-optic modulators depending upon the use of a crystalline body showing a bulk interaction have used ferroelectric materials although the realtionship between ferroelectric and electric-optic activity is not well understood. An important class of materials relies upon the change in dielectric constant or refractive index occurring at or near a ferroelectric transition temperature with applied voltage, and it is in such materials that the strongest interactions have been measured. Most bulk-effect electro-optic devices using ferroelectric materials operate at temperatures substantially above the Curie point, that is, at temperatures such that the material is no longer ferroelectric. Both KDP and KTN are in this category. Prior to the work which gave rise to this invention, it appears that only one significant material operating in its ferroelectric region gave evidence of an electro-optic interaction of device interest. This material is lithium niobate, LiNbO₃. See 5 Applied Physics Letters 62 (1964).

Lithium niobate is a linear material which is readily grown, readily cut, readily polished, available in requisite crystal size, and which shows an effect considerably stronger than that of KDP. It would be a most useful modulator material except for the fact that passage of electromagnetic energy at suitable signal levels produces an accompanying radiation damage which destroys its utility. See 9 Applied Physics Letters 72 (1966). Work in progress shows some promise of eventually overcoming this difficulty, but substantial acceptance must await such development.

Due largely to the earliest and continuing association of the two materials, LiNbO₃ and LiTaO₃, initial experiments included parallel runs conducted on the two materials. All such experiments, while showing a strong interaction for the niobate, showed no interaction whatever for the tantalate. See Journal of the American Ceramic Society, volume 48, page 112 (1965). The tantalate was of particular interest since selected sections showed no evidence of radiation damage.

SUMMARY OF THE INVENTION

Single domain crystals of the approximate nominal composition LiTaO₃ such as may result from poling either during or subsequent to growth are found to manifest an electro-optic interaction similar to that of lithium niobate. This finding is considered unusual in view of the fact that poling of the niobate has little apparent effect on the electro-optic activity of the niobate. Unlike the niobate, crystalline sections of the tantalate manifest no radiation damage, so that devices utilizing this material have been operated over long terms at acceptable signal levels. The tantalate is otherwise possessed of all of the excellent physical and chemical properties of the niobate, and like the niobate is readily grown in large crystal size by conventional techniques to yield uniform device-grade material. LiTaO₃ modulators operating either continuous or pulse, either resulting in intensity, frequency, or phase variation with broad bandwidths are described and form preferred embodiments of the invention. Due to the excellent broadband, low optical absorption of LiTaO₃, the invention devices may be used over the bandwidth range including from 4 microns to 0.35 micron.

DETAILED DESCRIPTION

General properties of LiTaO₃

Figure 1:
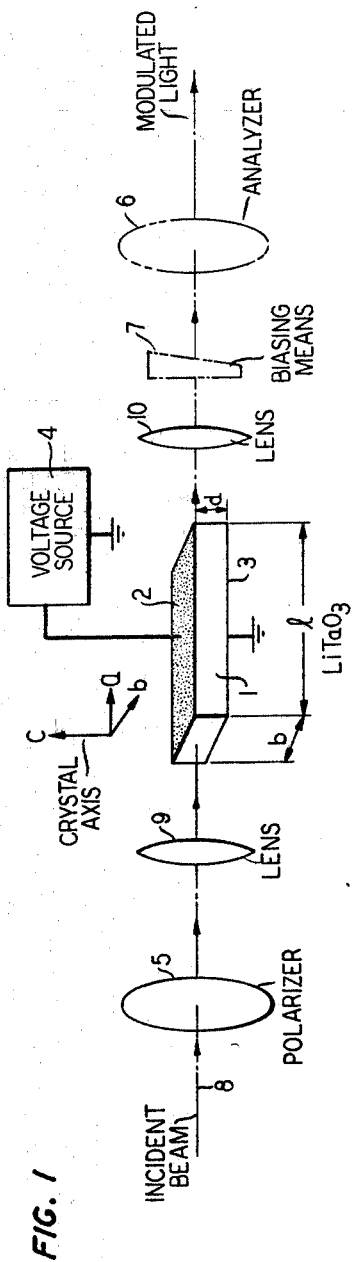
FIG. 1 is a schematic representation of an LiTaO₃ modulator utilizing through-transmission of electromagnetic wave energy.

(1) $LiTaO_3$ may be readily grown, for example by the Czochralski technique (Journal of the American Ceramic Society, volume 48, page 112 (1965), and it may be poled, for example, subsequent to growth by cooling through its Curie temperature (from 540° C. to 660° C. depending on composition) with an applied D.C. electrical field of, for example, 250 volts/cm. (8 Applied Physics Letters, 81 (1966)).

(2) The material is hard (hardness about 5.5 mhos) and may be given a high optical polish by usual optical techniques. It is chemically and physically stable and shows no measurable deteriorative effect upon exposure to any normally encountered atmospheric constituents.

(3) $LiTaO_3$ is a linear transverse electro-optic material which evidences a half-wave voltage of from 17,000 v. to 1500 v. over the wavelength range of from four microns to 0.35 micron. The half-wave voltage at 6328 A. units (0.6328 micron, a frequency available by use of the helium-neon laser) is 2700 volts for a body having the same transverse and longitudinal dimension. In common with other transverse materials, the required half-wave voltage may be decreased by a relative decrease in the transverse dimension, that is in the dimension across which the field is applied. An aspect ratio of 1/80 has been found expedient in certain of the experiments reported in an example herein, that is, dimensions corresponding with the round-trip longitudinal beam transmission direction dimension of 800 mils and a transverse dimension of 10 mils. The resulting half-wave voltage is 33 volts.

(4) The material has a relative dielectric constant $\epsilon_r$ of 42 which, while about twice that for KDP, is considerably smaller than that for KTN. The constant is found to be relatively independent of frequency along the C-axis.

(5) The dielectric loss constant $\tan \delta$ is 0.001.

(6) Lithium tantalate is in the 3m. crystallographic point group. Electro-optic effect is largest when voltage is applied along the C-axis and light is propagated normal to the C-axis.

(7) Lithium tantalate is a uniaxial material with a small static birefringence (ordinary index $n_o = 2.175$, extraordinary index $n_e = 2.180$ at a wavelength of 6328 A. The indices are slightly temperature dependent.

DETAILED DESCRIPTION OF THE DRAWING

In FIG. 1 the electro-optic element 1 of $LiTaO_3$ cut with the orientation as shown (a short dimension across which field is applied corresponding with the C-axis) is of the dimensions 0.01″ in height and thickness and 0.4″ in length. Electrodes are affixed on surfaces 2 and 3, across which an electric field source for modulating the carrier is introduced as from voltage source 4. Body 1 is placed between a pair of crossed polarizers 5 and 6 having their polarization directions oriented at +45° and −45°, with respect to the C-axis of $LiTaO_3$ body 1. A biasing source 7 which may, for example, be a quartz wedge is used to adjust to extinction or to the required relative transmission intensity depending upon the desired mode of operation. A beam 8 of electromagnetic wave energy as from a helium-neon laser is propagated as shown. Lens 9 serves to focus the beam within body 1 and lens 10 is used to focus the exiting beam.

It has been mentioned that the static birefringence of lithium tantalate is slightly temperature dependent. The material is also strongly piezoelectric. While both effects may be ignored, for optimum performance they should be taken into consideration. In the particular apparatus upon which the examples are based, both of surfaces 2 and 3 were plated and one was then bonded to a copper block. In these experiments, the temperature of the copper block was controlled to minimize the change in static birefringence, control to 0.05° C. resulting in a maximum fundamental modulation intensity deviation of about 1.5%. The copper block served also as a damper for elastic waves excited through the piezoelectric coupling.

Figure 2:
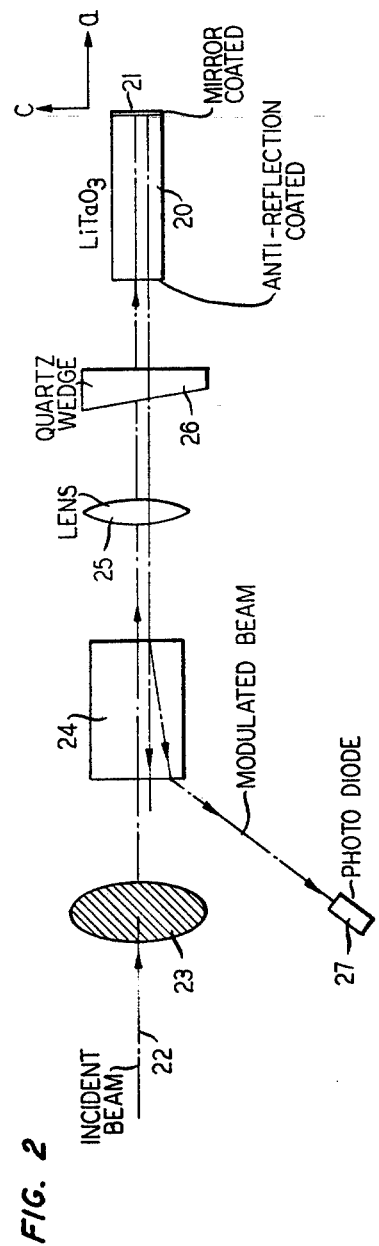
FIG. 2 is a schematic representation of a different form of LiTaO₃ modulator in which the wave energy is caused to retraverse the electro-optic material.

The modulator of FIG. 2, like the other modulators of the invention, is dependent for its operation on a single domain single crystal body 20 of $LiTaO_3$. In accordance with this arrangement, the crystal is again oriented so that the transmission direction is normal to the C direction, along which latter the modulating field, not shown, is applied. It differs from the modulator of FIG. 1 primarily in the provision of a reflecting coating on face 21 corresponding with the final transmission position of the beam, so that the wave energy is caused to retraverse the crystal. The remainder of the apparatus functions in the general manner of that of FIG. 1 and provides for incident wave energy 22 which first passes through a polarizer 23, again oriented with its plane of polarization 45° to the C-axis of body 20. The polarized beam then passes through a Rochon prism 24 which, as shown, has the ability to change the direction of a traversing light beam in accordance with the polarization, thence through lens 25, which focuses the beam in this instance on a plane corresponding with the mirror-coated end of the crystal 20 (the center of its traversal path). Quartz wedge 26 serves to bias the wave energy so as to produce the desired rotation including separation in Rochon prism 24. The beam shown traversing and retraversing body 20 is modulated in accordance with the applied field and upon exiting passes through biasing body 26, lens 25, and finally through prism 24, by means of which it is deflected so as to be detected by, for example, photodiode 27.

Since the Rochon prism 24 is dependent for its operation on rotation of the polarization plane of the beam to separate the incoming and outgoing energy, the arrangement is most suitably applied to an intensity modulator. The arrangement can be modified by tipping the tantalate and thereby separating incoming and reflected beams to adapt to frequency or phase modulation. The need for the prism is thereby eliminated. The arrangement of FIG. 1 is, of course, suitable for use as a phase or frequency modulator, as well, in either of which use the polarization direction as adjusted, for example, by polarizer 5 is caused to correspond with the C-axis of the crystal or the direction of applied field. While a normal direction, that is one in which the polarization direction in the polarizer is rotated normal to the direction of applied field, may result also in phase or frequency modulation, the modulation intensity in this direction is somewhat weaker and is therefore not preferred. Since such operation requires neither the biasing means 7 nor the analyzer 6, these elements are shown in' phantom.

EXAMPLE 1

The apparatus depicted in FIG. 1 was set up utilizing a rectilinear body of single domain single crystal lithium tantalate of the dimensions 0.01″ by 0.01″ by 0.4″. The two surfaces normal to the C-axis were vacuum deposited with chromium and gold and then electroplated with copper and gold, and one of the surfaces was soldered to the copper block. The temperature of the copper block was controlled to about ±0.05° C. The assembly was placed between a pair of crossed polarizers, the first of which was oriented −45° and the second of which was oriented +45° with reference to the crystallographic C-axis of the lithium tantalate body. A quartz wedge was inserted in the apparatus as shown to optically bias the light beam to extinction in the absence of an applied electric field. The capacitance of the sample was 5 picofarads. A single mode helium-neon laser emitting .6328 micron linewidth and generating 1.5 milliwatts in a gaussian beam was focused to approximately 0.002″ diameter at a focal plane approximately midway in the transmission direction. The R.F. voltage across the crystal was maintained at 0.5 volt/RMS as the frequency was varied. The half-wave voltage of the sample was 76 volts peak to peak. Modulation was observed from D.C. to over a frequency of 900 megahertz.

EXAMPLE 2

The apparatus of FIG. 1 was operated using as the modulating field an amplifier having an output of 6 volts RMS and capable of driving the lithium tantalate body from D.C. to over 200 megahertz. The input to the amplifier was driven by a constant amplitude voltage sweeper. Output was detected in a photodiode, the output of which was measured by a tuned R.F. voltmeter in a frequency tracking mode of operation. Output was substantially constant over the entire range of the sweep frequency of from about 0.1 megahertz to about 200 megahertz.

EXAMPLE 3

Example 2 was repeated, however using the round-trip apparatus of FIG. 2. Using the same transistor amplifier developing an output of 0.2 watt, approximately 80% modulation was achieved from D.C. to 220 megahertz.

EXAMPLE 4

The apparatus of FIG. 2 was utilized as a pulse code modulator as a 224 meghertz bit rate. The lithium tantalate body was again in the shape of a parallelopiped of the same dimensions as set forth in the above examples. The surface through which the beam was introduced was provided with an antireflection coating and the terminal end was provided with a dielectric reflecting coating. Temperature was stabilized to ±0.04° C. The half-wave voltage for the geometry was about 30 volts (30 volts applied along the C-axis resulted in effective rotation of about 90°). Voltage was applied across the crystal in the form of pulses with a rise time of 2.1 nanoseconds, a width of 3.3 nanoseconds, and a fall time of 3.3 nanoseconds. The beam source was a helium-neon laser operating at 6328 A. units, phase locked by a KDP phase modulator at 224 megahertz, so that the output consisted of a regular sequence of optical pulses 0.6 nanosecond wide separated by a space of 4.46 nanoseconds. The drive for the KDP modulator was provided by the 224 megahertz sine wave timing signal from a nine-bit PCM word generator. The word generator provided the input to the pulse amplifier in the form of a repetitive coded sequence of nine one-volt pulses with pulses occurring at a 224 megahertz rate. The optical pulses from the laser were by this means synchronized with the electrical pulses from the word generator. The optical output from the modulator was detected by a germanium avalanche photodiode. Electrical pulse width was about 1 nanosecond. The modulator exhibited a 23 db optical power extinction ratio between the pulse and no pulse condition at the output of the modulator. With the field applied, the modulator exhibited an insertion loss of 1.1 db including the contribution of all the associated components.

For the PCM mode of operation of Example 3, the pulse width was set by the laser medium and not the electronic circuitry. Substitution of a solid-state laser such as YAG neodymium can result in optical pulse width an order of magnitude smaller (see Applied Physics Letters, volume 8, page 180, 1966). Since required drive power is reduced for increasing optical frequency, most efficient operation utilizing such a laser source includes a second harmonic generator such as lithium niobate, as described in 5 Applied Physics Letters 234 (1964). For most effective operation the SHG generator is included within the laser cavity.

The invention has been described in terms of a limited number of embodiments. Variations which benefit by the inventive teachings are known and are to be included within the scope of the appended claims. For example, while optimum operation of the devices shown will probably use the $r_{13}$ and or $r_{33}$ electro-optic coefficients as indicated, other coefficients are usable. Similarly, while reference is made to the nominal composition $LiTaO_3$, the electro-optic effect is observed over a substantial compositional range (approximately ±10 atom percent in the lithium to tantalum ratio). Other additives in maximum total amount of about one atom percent may be tolerated. All such variations are to be included within the terminology "nominal composition."

What is claimed is:

1. Modulator for electromagnetic wave energy in the wavelength range of from about four microns to about 0.35 micron including a ferroelectric electro-optic crystalline medium, means for transmitting a beam of said wave energy through said medium, and means for impressing an electric field across said medium in such direction as to affect a transmission property for the said beam, characterized in that the said medium is a single crystal, single domain body of a composition approximating the nominal formula $LiTaO_3$.

2. Modulator of claim 1 in which the means for impressing the said field is substantially along the crystallographic C-axis of the said body and in which the said beam is substantially normal to the crystallographic C-axis of the said body.

3. Modulator of claim 2 in which the said beam is plane polarized at an angle intermediate that corresponding with the crystallographic C-axis and 90° to the C-axis, together with means for detecting the degree of rotation of the beam exiting from the said body.

4. Modulator of claim 3 in which the means for analyzing the rotation is a polarizing medium.

5. Modulator of claim 4, in which the polarizing medium is oriented so as to produce substantial extinction in the absence of an applied field.

6. Modulator of claim 5 in which the said beam is introduced into the said body in the form of pulses.

7. Modulator of claim 2 in which the incoming beam is polarized on a plane substantially parallel to the crystallographic C-axis in the said body.

8. Modulator of claim 2, with means for reflecting the said beam at the terminus of its first traversal within the said body so as to cause the beam to retraverse the body.

9. Modulator of claim 8 in which the incoming beam is plane polarized at an angle intermediate that corresponding with the crystallographic C-axis and an angle 90° to the C-axis, together with displacing means for displacing the outgoing beam relative to the incoming beam.

10. Modulator of claim 9 in which the said displacing means is a Rochon prism.

11. Modulator of claim 2 together with means for temperature stabilizing the said body.

12. Modulator of claim 11 in which the means for temperature stabilizing includes a heat sink bonded to the said body.

References Cited

Denton et al.: "IEEE Journal of Quantum Electronics," April 1966, p. XLI.

JOHN KOMINSKI, Primary Examiner

D. R. HOSTETTER, Assistant Examiner

U.S. Cl. X.R.

332—52; 350—160